J. F. WHITE.
WILLOW.
APPLICATION FILED SEPT. 2, 1909.
997,723.
Patented July 11, 1911.
2 SHEETS—SHEET 2.
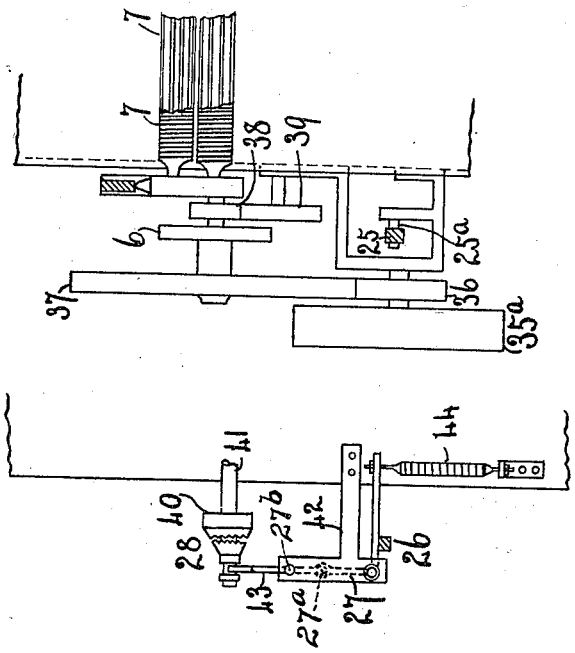
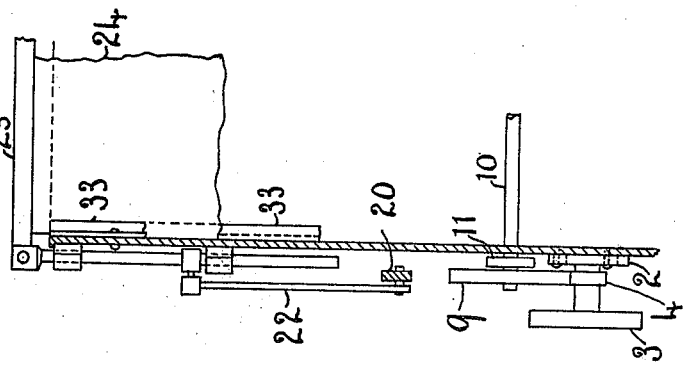

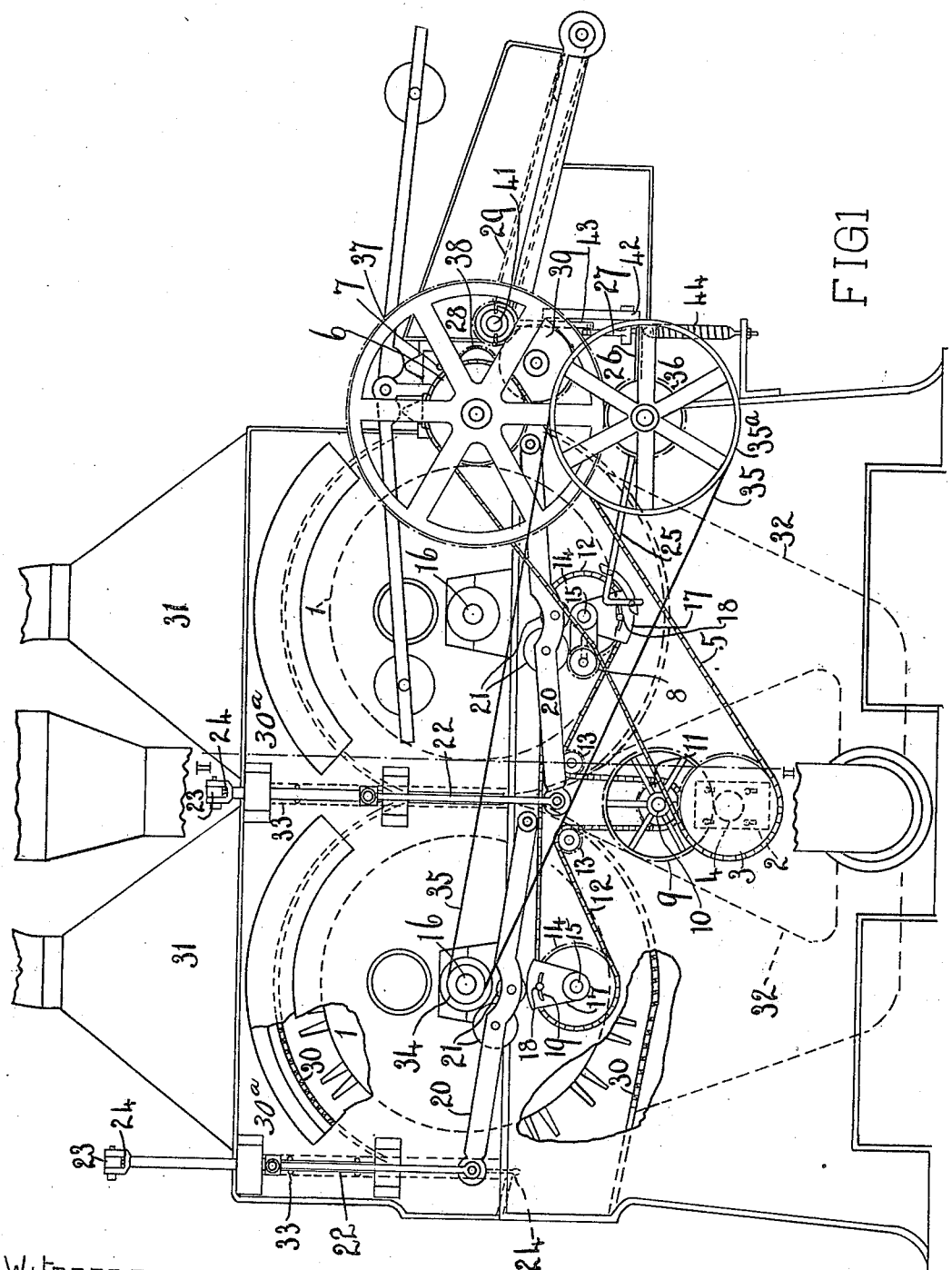

UNITED STATES PATENT OFFICE.

JOHN FRANCIS WHITE, OF BRADFORD, ENGLAND.

WILLOW.

997,723.

Specification of Letters Patent. Patented July 11, 1911.

Application filed September 2, 1909. Serial No. 515,929.

*To all whom it may concern:*

Be it known that I, JOHN FRANCIS WHITE, a subject of the King of Great Britain, residing at 20 Cunliffe Villas, Bradford, Yorkshire, England, have invented certain new and useful Improvements in Willows, Machines for Opening and Cleaning Fibers, and Rag-Dusting Machines.

This invention relates to improvements in or connected with willows, machines for opening and cleaning fibers, rag dusting machines and the like, whereby the material is more effectively opened, and the dust and dirt capable of being removed more efficaciously.

The machine itself is of the type in which the feed is intermittent and the material only allowed to escape from the machine at stated intervals.

In the present invention there are multiple cylinders and the passage of the material from one cylinder to the other and from the last cylinder to the discharge is regulated by suitably arranged slides, dampers or the like, the means controlling the slides and the feed being interconnected so as to insure the correct timing.

In the accompanying drawings a two cylinder willow is shown to which the present invention has been applied.

In the drawings Figure 1 is a side elevation of the willow as a whole with certain parts broken away, while Fig. 2 is a fragmentary view taken on the line II—II of Fig. 1 showing simply the method of guiding and operating the shutters hereinafter described and a portion of the driving gear. Fig. 3 is a detailed view of the gearing showing how the intermittent feed is operated. Fig. 4 is a further fragmentary view showing the driving gear for the feed rollers and the connection between the feed rollers and the intermittent gearing shown in Fig. 3.

In Fig. 1 the willow is provided with two cylinders 1 connected up with suitable driving gear arranged on the opposite side of the willow from that shown in the drawing. At a point midway between and below the two cylinders is arranged an adjustable stud-plate 2 which carries a sprocket wheel 3 and a pinion 4 rotatable therewith. This sprocket wheel is connected up by a chain 5 or other means to a sprocket wheel 6 on the shaft driving the feed rollers 7 and to an idle tension sprocket 8. The pinion 4 on the adjustable stud-plate gears with a toothed wheel 9 on a fixed shaft 10 which passes right through and is rotatable in the frame of the machine. This shaft carries at each side a sprocket wheel 11 which is connected up by a chain 12 or other means passing over guide sprockets or other tension means 13 to sprocket wheels 14 mounted on studs 15 preferably immediately below the axes 16 of the respective cylinders 1. Each of these studs 15 carries a cam 17 which is capable of a certain amount of radial adjustment on the stud and relative to the respective sprocket 14 by means of a pin 18 and slot 19. Pivoted on the frame and at each side are two levers 20 carrying anti-friction rollers 21 about their middle points which are each of them acted upon by one of the cams 17 above referred to. The corresponding levers on each side of the frame are connected at their outer end with links 22 connected by a cross shaft 23 which cross shaft carries a shutter or damper 24 one of which controls the passage of fiber from the first cylinder to the second and the second of which controls the passage of fiber from the machine.

In the path of the cam controlling the intermediate shutter or damper is a lever 25, supported on a bearing 25$^a$ (Fig. 4) the outer end 26 of which is connected to a bell crank lever 27 which is connected by a pin and slot as at 27$^a$ to a lever 43 fulcrumed at 27$^b$ to a bracket 42 for operating a suitable clutch mechanism 28 controlling the feed apron 29 (Fig. 3). The cams 17 are so timed, the one set relative to the other set that the intermediate damper or shutter is closed while the fiber or material is being fed to the machine and only open to allow the passage of the fiber from the first cylinder to the second while the feed is inoperative. The discharge damper or shutter is never open when the intermediate damper or shutter is open, but is opened to allow the discharge of the fiber and then closed just before the intermediate damper or shutter opens to allow the passage of fibers from the first cylinder to the second. The relative timings of the two shutters and of the clutch 28 controlling the feed is obtained by the adjustment of the cams 17 relative to their sprocket wheels 14 while the ratio between the number of revolutions of the cylinders and the opening of the dampers or shutters is obtained by altering the dimensions of the pinion 4, and if need be, the sprocket wheel 3 on the adjustable stud-plate 2 above referred to.

About each cylinder 1 there is arranged a casing 30ᵃ which casings are arranged concentric about their respective cylinders except at the outlet of the machine. These casings have built into them or partially consist of gratings 30 which are located both over and under each of the cylinders 1. These gratings 30 are preferably combined with suitable means for aiding the removal of the dust and dirt which passes therethrough such as the hoods 31 and hoppers 32, through which air may be drawn by suction. The lower portions of adjacent casings are joined together while the shutters or dampers 24 between the respective cylinders are located and work between the upper portions of the adjacent casings 30ᵃ in such a way as to in their lowermost position close down upon the upstanding edge formed by the junction of the lower portions of the casings 30ᵃ. It will thus be seen that on the shutter being opened any fiber which has been rotated by the cylinders will be thrown out, owing to the centrifugal force generated through the throat formed between the upper and lower portions of the casings in which the shutters work. The shutters or dampers 24 are guided between angle-irons 33 shown in Figs. 1 and 2 suitably secured to the inner sides of the walls of the willow. The apparatus as a whole is driven from a fast and loose pulley device on the side of the willow away from that shown in the drawing, and the two cylinders are also connected up by pulleys on this side. The second cylinder on the side shown in the drawing is however provided with a small pulley 34 which drives by a suitable belt 35 the pulley 35ᵃ, which by means of a pinion 36 connected thereto drives the large sprocket wheel 37 which is connected to the sprocket wheel 6 above referred to, whence the shutters are operated as above described. The sprocket wheels 37 and 6 are mounted on the shaft of the lower of the second pair of feed rollers 7 which are preferably fluted. These feed rollers are driven therefrom. On the other side of the machine the rollers are interconnected by gearing in any known manner so that they are driven synchronously. The lower of the first pair of rollers which are preferably clothed with Garnett wire has a sprocket wheel 38 on an extension of its shaft which in turn drives the idle wheel 39 connected to the gear wheel 40 which is rotatably mounted on the shaft 41 controlling the feed apron 29. This shaft carries the clutch device 28 suitably keyed on the shaft 41. The outer end of the lever 43 controlling the clutch 28 is normally pulled downward by a spring 44 and at predetermined times pressed upward by the end 26 of the lever 25 as described.

I declare that what I claim is:—

1. In machines for opening and cleaning fibers, rag dusting machines and the like, a plurality of cylinders, feed rollers, a shutter between each cylinder and between the last cylinder and the outlet, and means for operating the shutters alternately and for throwing the feed rollers in gear when the shutter between the first two cylinders is in closed position, substantially as described.

2. In machines for opening and cleaning fibers, rag dusting machines and the like, a plurality of cylinders, feed rollers, a feed apron in connection with said feed rollers, a shaft operating said apron, a clutch on said shaft, a shutter between each cylinder and between the last cylinder and the outlet, means for raising the shutters alternately including a cam, a lever actuated by the cam, and connections between said clutch and the lever whereby the clutch will be thrown in gear when the shutter between the first and second cylinders is in down position, substantially as described.

3. In machines for opening and cleaning fibers, rag dusting machines and the like, a plurality of cylinders, feed rollers in connection with the first cylinder, a feed apron in connection with said feed rollers, a shaft operating said apron, a clutch on said shaft, a shutter between each cylinder and between the last cylinder and the outlet, levers pivoted on the machine, operating connections between said shutters and said levers, cams for operating said levers, a second lever actuated by the cam operating the lever for raising the shutter between the first and the second cylinders, and connections between said clutch and the second lever whereby the clutch will be thrown in gear when the shutter between the first and second cylinders is in down position, substantially as described.

4. In machines for opening and cleaning fibers, rag dusting machines and the like, a plurality of cylinders, a shutter between each two cylinders of said plurality of cylinders, a shutter between the last cylinder of said plurality of cylinders and the outlet of the machine, levers pivoted to the machine, operative connections between said shutters and said levers, sprocket wheels secured to said machine one for each lever, cams mounted on said sprocket wheels engaging with said levers, a third sprocket wheel mounted on said machine, a chain passing over each sprocket wheel carrying said cams and over the third sprocket wheel, means for rotating said third sprocket wheel, feed rollers, a feed apron in connection with said feed rollers, a shaft operating said apron, a clutch on said shaft, connection between one of said cams and said clutch for throwing said clutch into and out of gear, and means for rotating said feed apron shaft.

5. In machines for opening and cleaning fibers, rag dusting machines and the like, feed rollers, means for rotating said rollers, a feed apron in operative connection with said feed rollers, means for intermittently operating said feed apron, a rotatable cylinder within said machine fed from said feed rollers, a second cylinder in said machine fed from first cylinder, a shutter between said first cylinder and said second cylinder, means for operating said shutter, an outlet to the machine, a shutter between the second cylinder and the outlet, means for operating said second shutter, means for regulating the time for alternately opening the said two shutters, and means connected to said means for operating the first shutter and for throwing the forwarding means for the feed apron into and out of gear.

6. In a machine of the character described, the combination of a main casing, a plurality of work cylinders journaled therein, secondary casings for said cylinders comprising upper and lower concentrically arranged grid members substantially inclosing the upper and lower portions of said cylinders and communicating with each other through a throat opening, an outlet opening being provided for the last cylinder in the series, and said walls being provided with grid openings, shutters normally closing said throat openings and outlet opening, means for driving said cylinders, levers pivoted to said main casing, connections between said levers and said shutters, and means for intermittently and alternately elevating said shutters comprising rotary cam members engaging beneath said levers, and means driving said cam members, substantially as described.

7. In a machine of the character described, the combination of a main casing, a plurality of work cylinders journaled therein, secondary casings for said cylinders comprising upper and lower concentrically arranged grid members substantially inclosing the upper and lower portions of said cylinders and communicating with each other through a throat opening, an outlet opening being provided for the last cylinder in the series, and said walls being provided with grid openings, shutters normally closing said throat openings and outlet opening, means for driving said cylinder, levers pivoted to said main casing, connections between said levers and said shutters, and means for intermittently and alternately elevating said shutters comprising rotary cam members engaging beneath said levers, means for adjusting the position of said rotary cams relatively to each other to control the time of operation of said shuters, and means for rotating said cam members, substantially as described.

In witness whereof I have hereunto signed my name this 19th day of August 1909, in the presence of two subscribing witnesses.

JOHN FRANCIS WHITE.

Witnesses:
HERBERT PUMPHREY,
FRED HAMMOND.

Copies of this patent may be obtained for five cents each, by addressing the "Commissioner of Patents, Washington, D. C."